Oct. 31, 1961 L. E. POTTER ET AL 3,007,093

VARIABLE CAPACITOR

Filed March 27, 1959 2 Sheets-Sheet 1

INVENTORS
LOUIS E. POTTER &
EDWARD A. BENNETT

BY A. Russinoff
ATTORNEY

INVENTORS
LOUIS E. POTTER &
EDWARD A. BENNETT
BY A. Russinoff
ATTORNEY 3,007,093
Patented Oct. 31, 1961

3,007,093

VARIABLE CAPACITOR

Louis E. Potter, Pennsauken, and Edward A. Bennett, Haddonfield, N.J., assignors to Radio Corporation of America, a corporation of Delaware Filed Mar. 27, 1959, Ser. No. 802,447
1 Claim. (Cl. 317—249)

This invention relates to variable capacitors, and more particularly relates to continuously variable multi-section capacitors for the tuning of signal receivers and the like.

In the development of electronic equipment, such as radio signal receivers, the trend toward miniaturization has resulted in demands for smaller and smaller component parts. This has been particularly true with respect to variable tuning capacitors, the most commonly used type being an air dielectric capacitor having a plurality of parallel stator plates and a plurality of rotatable plates which intermesh with the stator plates. This type of capacitor is relatively bulky in size, and requires a disproportionate space for installation in comparison to the other components of a receiver. When these capacitors are used as the tuning elements for radio receivers, two or more units are mechanically ganged together for unicontrol operation, adding even further to the size of the unit.

It has been proposed that the size of these capacitors be reduced by the provision of a solid dielectric material between the plates thereof thereby permitting closer spacing of the plates. However, the resulting structures, although somewhat smaller in size, still require a large amount of space. Thus, miniature electronic apparatus utilizing capacitors of this type must be designed around the required dimensions of the capacitor, or in other words, variable capacitors heretofore available are not adaptable to a design which permits their use in what might be the most convenient space available.

Another problem encountered in the miniaturization of electronic apparatus is that by its very nature the component parts must be placed in close proximity to each other thereby increasing the problems attendant with undesired circuit interactions. In certain applications using multi-section variable capacitors, it has been found that excessive coupling between the sections thereof produces undesirable circuit interactions. For example, where the two sections of the tuning capacitor are used to tune the signal selection and oscillator circuits of a miniaturized superheterodyne radio signal receiver, coupling between the two sections may cause the tuning of one circuit to affect the tuning of the other, or in some cases it has been found that this coupling produces oscillation at the signal frequency.

Still further, with conventional air dielectric parallel plate type capacitors it is conventional to slot the plates thereof to permit adjustment of the tuning characteristic for tracking purposes. The actual adjustment is made by bending or otherwise deforming the portions of the plates defined by the slots to provide a desired capacitance vs. rotation characteristic. However, where the capacitor plates are formed by any of a number of processes generally known as, or similar to, printed circuit processes, the exact configuration of the capacitor plate for providing the desired tracking characteristic must be determined in advance, since there is no convenient way of accurately changing the configuration of the capacitor plate after it has been formed.

Accordingly, it is an object of this invention to provide an improved variable capacitor of reduced size and simple construction.

It is a further object of this invention to provide an improved multi-section variable tuning capacitor which may be easily constructed to conform to a wide variety of spacial and dimensional restrictions, and which is thereby readily adaptable for use in miniature electronic apparatus.

Another object of this invention is to provide an improved multi-section variable tuning capacitor having an extremely small amount of stray coupling between the sections thereof.

A still further object of this invention is to provide an improved variable capacitor including a printed circuit capacitor plate, the configuration of which may be easily adjusted to provide a desired capacity change for a given adjustment of the movable capacitor plate.

A still further object of this invention is to provide an improved variable capacitor which has a minimum amount of stray capacitance between the plates thereof thereby providing a large minimum-to-maximum capacitance ratio so that when the capacitor is connected in the tuning circuit of a signal receiver, a wide tuning range can be achieved with a small tuning unit.

The multi-section variable capacitor of the invention includes a pair of elongated coextensive plates each formed on a suitable insulating base by using a printed circuit process or the like, and positioned in spaced parallel planes. The multi-section capacitor also includes a second pair of plates, each being positioned parallel to and closely adjacent one of said first pair of plates, but separated therefrom by a suitable insulating material preferably having a high dielectric constant. One of the plates of each pair comprises one of said capacitor sections, and the other plate of each pair comprises another capacitor section. One of said pairs of plates is supported as a unit for longitudinal movement with respect to the other pair of plates to simultaneously vary the capacitance of each section of the variable capacitor.

In accordance with one embodiment of the present invention, the elongated plates of the capacitor are supported on separate insulating bases, and are then affixed on opposite sides of a conductive ground plane member. The relatively movable plates for the capacitor are positioned adjacent the elongated plates but spaced therefrom a suitable dielectric, and are movable as a unit to provide simultaneous variation of the capacitance of the two capacitor sections. The ground plane member substantially reduces stray couplings between the two sections of the capacitor and thereby reduces the problems attendant with undesired interaction or regeneration in the circuits with which the capacitor may be connected.

A feature of the invention is that where capacitor plates are substantially two dimensional structures, such as when formed by a printed circuit process, the plates may include relatively narrow tabs, or toothed portions projecting therefrom. Such portions may be easily cut with a knife or other abrading tool to adjust the capacitor plate configuration and thereby provide a means for easily adjusting the capacitor to provide the desired capacity change for a given adjustment of the movable plate.

The novel features which are considered characteristic of this invention are set forth with particularity in the appended claim. The invention itself, however, both as to its organization and method of operation, as well as additional objects and advantages thereof, will best be understood from the following description when read in connection with the accompanying drawings, in which:

FIGURE 5 is a plan view of a capacitor plate formed by a printed circuit process or the like, illustrating a modification of the invention.

Figure 1:
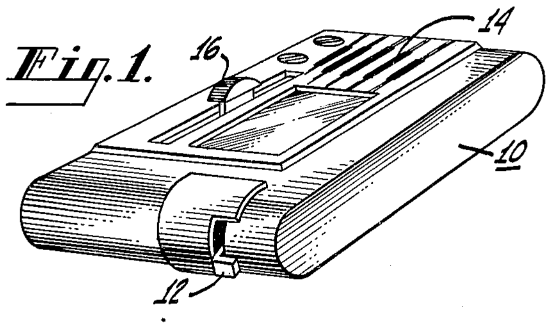
FIGURE 1 is a perspective view of a miniature signal receiver incorporating the variable multi-section tuning capacitor of the invention.

Referring now to the drawings, wherein like reference numerals will be used to designate similar components throughout, FIGURE 1 shows a miniature radio signal receiver 10 incorporating a multi-section variable capacitor in accordance with the invention. This receiver may, if desired, use microminiature circuit modules and transistor amplifying devices as the signal processing circuits thereof, and is extremely small in size. The receiver includes a knob 12 for controlling the application of supply voltage from an internally contained battery to the receiver circuits. If desired, the knob 12 may also be ganged with a volume control resistor for adjusting the volume of the sound emanating from a loudspeaker positioned behind the grillwork 14. The receiver tuning is controlled by a knob 16 which is longitudinally movable along the length of the receiver casing. Movement of the knob 16 adjusts the capacity of the various sections of the multi-section capacitor of the invention, to tune the receiver circuits to the proper frequencies for translating a desired radio signal.

Figure 2:
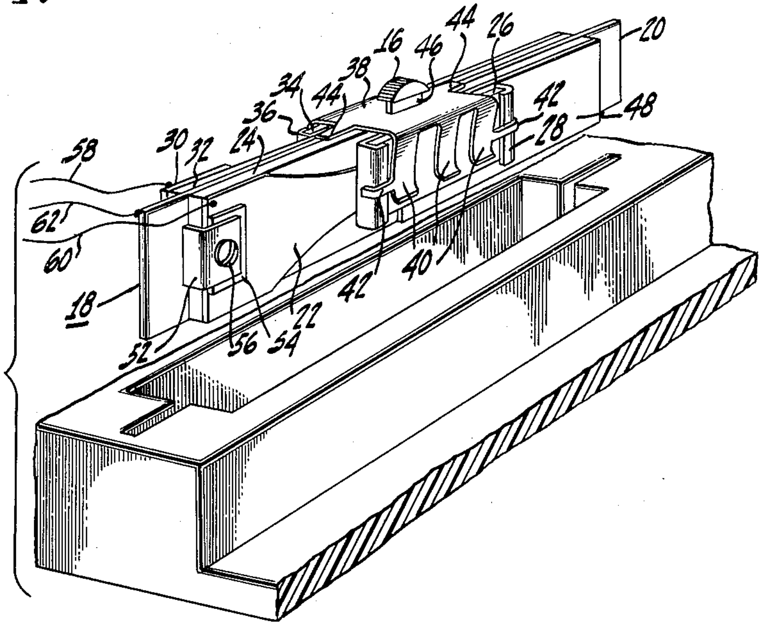
FIGURE 2 is a perspective view of the multi-section variable capacitor assembly removed from the receiver casing.
Figure 7:
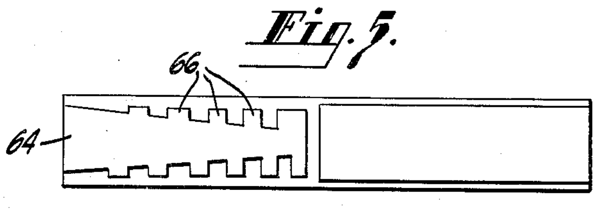

The tuning capacitor 18 used in the miniature radio signal receiver 10 is shown in FIGURE 2. This capacitor comprises two generally similar sections which are separated by a conductive ground plane member 20.

One section of the capacitor 18, which may, for example, be used to tune the signal selection circuits of the receiver 10, includes an elongated conductive plate 22 which tapers from a maximum width near one end thereof to a minimum width at the other end thereof. The plate 22 is supported on a rectangular insulating panel 24 which is affixed to one side of the ground plane member 20. A generally rectangular conductive capacitor plate 26 is supported for longitudinal movement with respect to the plate 22 to provide variable areas of registration therebetween, and hence a variable capacitance. A thin coating or sheet of high dielectric material 28 covers that surface of the movable plate 26 abutting the plate 22 to permit close spacing and prevent electrical contact between the plates.

The second section of the capacitor which may, for example, be used to tune the oscillator circuits of the receiver 10 includes an elongated conductive plate 30 supported on an insulating support 32 which is affixed to the side of the ground plane member 20 remote from the first capacitor section. The second section of the capacitor also includes a generally rectangular conductive plate 34 which is adapted to be moved longitudinally with respect to the plate 30. The plates 30 and 34 are separated by a thin coating or sheet of dielectric material 36 in the same manner as the plates 22 and 26.

The movable plates 26 and 34 are mechanically and electrically interconnected by an operating member 38. The operating member 38 which spans the capacitor assembly includes a series of downwardly extending spring fingers 40 which conductively engage the movable plates 26 and 34, and urge them inwardly so that the intervening dielectric material 28 and 36 is pressed into intimate conforming engagement with the fixed plates 22 and 30, respectively. The outer ones of the spring fingers 40 on both sides of the capacitor assembly include clips 42 which serve the dual purpose of clamping the dielectric material 28 and 36 covering the surface of the movable plates, and of holding the movable plates in the proper position as the operating member 38 is moved along the assembly. The portion of the operating member 38 spanning the capacitor assembly also includes a contact 44 which is adapted to ride on the edge of the ground plane member 20, thereby electrically connecting each of the movable plates 26 and 34 together and to the ground plane member. The operating member 38 also includes a lug 46 which is adapted to extend upwardly through the casing of the receiver 10 and support on the free end thereof the tuning knob 16.

Figure 4:
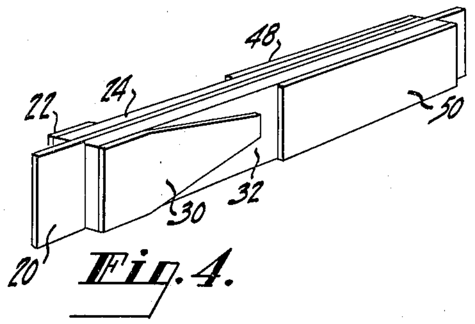
FIGURE 4 is a perspective view of the other of the stator plates of the variable capacitor shown in FIGURE 2.
Figure 3:
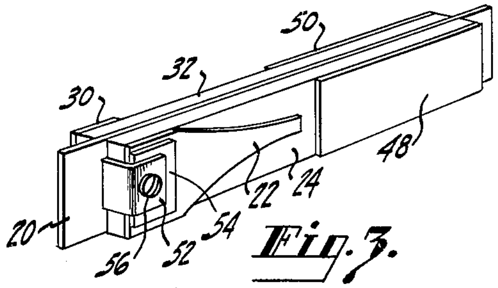
FIGURE 3 is a perspective view of one of the stator plates of the variable capacitor shown in FIGURE 2.

Specific configurations which the elongated capacitor plates 22 and 30 may assume are shown in FIGURES 3 and 4, respectively. These plates may be formed on the insulating panels 24 and 32 by any one of a number of processes generally known as printing circuit processes. The capacitor plates 22 and 30 are formed near one end of the panels 24 and 32 respectively and sliding surfaces 48 and 50 are formed at the opposite ends thereof. The sliding surfaces 48 and 50 are spaced from the capacitor plates 22 and 30 and are not in electrical contact therewith, but serve the purpose of providing a relatively smooth sliding surface for the movable capacitor plates 26 and 34 respectively. This permits smoother operation in the adjustment of the position of the operating member 38 and also prevents the movable plates 26 and 34 from catching on the narrow ends of the fixed capacitor plates and causing them to peel from the insulating supporting panels.

The elongated capacitor plates 22 and 30 are tapered to provide a capacitance characteristic which produces a substantially linear change in frequency for a given adjustment of the movable plates 26 and 34. It will be noted that the taper of the plates 22 and 30 differ in that the taper of the plate 30 is relatively linear whereas the taper of the plate 22 varies throughout the length of the plate. The reason for this is to establish a predetermined relationship between the capacity vs. adjustment of the movable plate characteristics of the two capacitor sections so that a desired tracking characteristic between the two capacitor sections may be achieved.

The ground plane member 20, which is sandwiched between the two sections of the capacitor, extends therefrom at either end. A resilient trimmer capacitor plate 52 engages an extension of the ground plane member 20 and overlies a portion of the fixed capacitor plate 22. A thin sheet or coating of insulating material 54 is positioned between the trimmer capacitor plate and the capacitor plate 22, and a screw 56 is provided for adjusting the capacitance existing between the plates 52 and 22.

The ground plane member 20 thus provides the major support for the capacitor assembly, and the ends thereof are adapted to be inserted into slots provided in the casing of the receiver 10, a portion of which is shown in FIGURE 2.

Electrical connections may be made to the multi-section capacitor through the conductors 58, 60 and 62. In the receiver of FIGURE 1, the conductor 62 is connected to circuit ground, and the conductors 60 and 58 are connected respectively to the signal selection and oscillator circuits of the receiver. From the foregoing it will be understood that the multi-section variable capacitor of the invention is adaptable to a large number of different configurations, and hence is readily adaptable to a design permitting its use in that space which is conveniently available in a miniature receiver. By way of example, the capacitor has an extremely small thickness dimension, and the width and length thereof may be varied over wide ranges without affecting its operation.

FIGURE 5 illustrates a modification of a capacitor plate formed by printed circuit process or the like which may be easily modified to exhibit a desired capacitance vs. movement of the movable plate characteristic. In accordance with one such printed circuit processing technique, an acid resistive coating is applied to a copper insulating panel in a pattern defining the desired portions of copper which are to be retained on the panel. The panel is then washed in an acid bath, and those portions of the copper which are not covered with the acid-resist material are etched away to leave the desired pattern. The acid-resist material is then removed from the copper leaving the desired pattern on the board.

In the capacitor plate shown in FIGURE 5 the plate 64 is generally tapered from a maximum thickness adjacent one end thereof to a minimum thickness adjacent the opposite end thereof. Actually, the plate may be regarded as a tapered plate having tabs 66 or toothed portions projecting therefrom substantially perpendicular to the longitudinal axis of the plate. As mentioned above, it is difficult to adjust capacitor plates of the type shown in FIGURES 2 and 3 to provide a tracking characteristic other than that which is provided by the plates after they have been formed. However, with the embodiment shown in FIGURE 5 it is a relatively simple matter to remove portions of the tips of the tabs extending from the generally tapered portion, without peeling or otherwise causing the copper to be loosened from the supporting panel.

Figure 6:
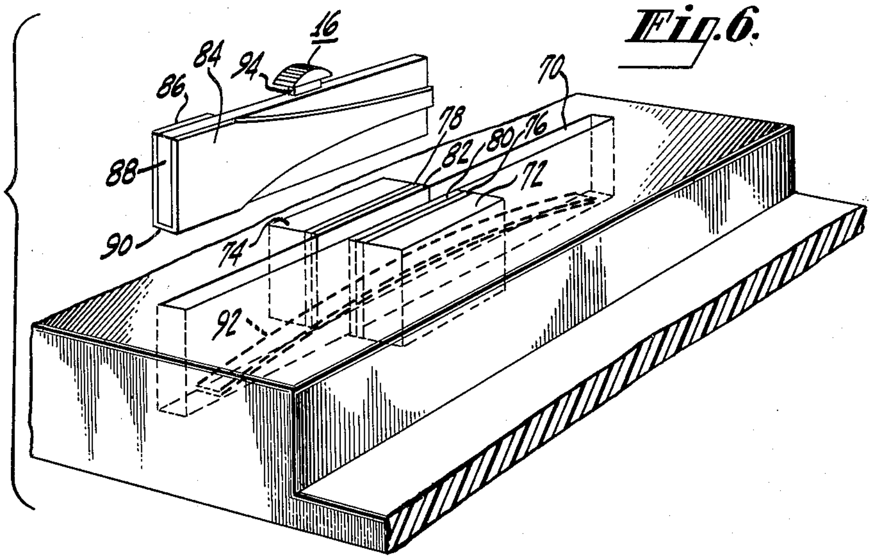
FIGURE 6 is a perspective view of a multi-section variable capacitor assembly illustrating another embodiment of the invention.

FIGURE 6 shows a modification of the invention wherein the tapered elongated conductive plates are movable relative to the other plates of the capacitor. In this embodiment, the casing of the receiver 10 which is shown partly broken away includes a slot portion 70 which is wider in the center thereof than near the ends. Situated in the wider portions on either side of the slot 70 are resilient portions 72, 74 (such as rubber) capacitor plates 76 and 78, and insulating members 80 and 82. The movable portion of the multi-section capacitor comprises a pair of elongated plates 84 and 86 which are formed on opposite sides of the insulating supporting panel 88. The plates 84 and 86 which may be similar in configuration to those shown in FIGURES 3 and 4, respectively, are conductively connected together through a conductive strap 90 which extends on the underside of the supporting panel 88. When the panel 88 is inserted into the slot 70 the strap 90 conductively engages a resilient conductive spring 92 located at the bottom of the slot 70. In the receiver of FIGURE 1, the conductive spring is connected with circuit ground, thereby providing a direct connection from the movable plates 84 and 86 to circuit ground. The signal selection and oscillator circuits of the receiver 10 may be connected to the multi-section variable capacitor of the invention by connection to the plates 76 and 78 respectively.

The supporting panel 88 includes an upwardly extending tab 94 which is adapted to extend from the receiver 10 casing and receive the tuning knob 16. In the assembled position, the supporting panel 88 and plates carried thereby are positioned in the slot 70. The resiliency of the portions 72 and 74 urge the fixed plates 76 and 78 and intervening dielectric portions 80 and 82 into intimate engagement with the surface of the plates supported on the insulating panel. As the supporting panel is moved longitudinally the capacitance between the plates 80—84, and 82—86 are varied simultaneously in accordance with the shaping of the plates 84 and 86 as described above.

What is claimed is:

A multi-section variable capacitor comprising an assembly including a ground plane member, a first insulating panel affixed to one side of said ground plane member, a first elongated conductive capacitor plate supported on the side of said panel facing away from said ground plane member, said first capacitor plate being tapered from a maximum width near one end thereof to a minimum width near the other end thereof, a second conductive capacitor plate supported for longitudinal movement closely adjacent said first capacitor plate to provide variable areas of registration between said first and second plates, first dielectric means interposed between said first and second plates, a second insulating panel affixed to the opposite side of said ground plane member, a third elongated conductive capacitor plate supported on the side of said second panel facing away from said ground plane member and substantially coextensive with said first capacitor plate, a fourth conductive capacitor plate supported for longitudinal movement closely adjacent said third capacitor plate to provide variable areas of registration between said third and fourth capacitor plates, second dielectric means interposed between said third and fourth capacitor plates, said third capacitor plate being tapered from a maximum width at the end thereof confronting the wide end of said first capacitor plate to a minimum thickness at the other end thereof, means for moving said second and fourth capacitor plates longitudinally with respect to said first and third capacitor plates including an operating member spanning said assembly and mechanically and electrically interconnecting said second and fourth capacitor plates, said operating member including a contact which conductively engages said ground plane member and thereby conductively connects said second and fourth capacitor plates to said ground plane member, said ground plane member extending beyond said panels adjacent the wide ends of said first and third conductive members, a conductive trimmer capacitor plate conductively engaging the portion of said ground plane extending beyond said panels, and overlying at least a portion of said first capacitor plate near the wide end thereof, means for insulating said trimmer capacitor plate from said first capacitor plate, and means for adjusting the capacitance between said trimmer capacitor plate and said first capacitor plate.

References Cited in the file of this patent

UNITED STATES PATENTS

| | | |
|---|---|---|
| 2,535,367 | Minnium | Dec. 26, 1950 |
| 2,581,966 | Mitchell | Jan. 8, 1952 |
| 2,809,547 | Le Caine | Oct. 15, 1957 |

FOREIGN PATENTS

| | | |
|---|---|---|
| 542,364 | Germany | Jan. 23, 1932 |
| 922,841 | Germany | Jan. 27, 1955 |